(12) United States Patent
Hessel

(10) Patent No.: US 7,245,876 B2
(45) Date of Patent: Jul. 17, 2007

(54) SYSTEM AND METHOD FOR SECURE WIRELESS CONNECTION

(75) Inventor: Clifford Hessel, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 617 days.

(21) Appl. No.: 10/292,443

(22) Filed: Nov. 13, 2002

(65) Prior Publication Data

US 2004/0092229 A1  May 13, 2004

(51) Int. Cl.
*H04B 7/00* (2006.01)
*H01Q 11/12* (2006.01)
*H01F 27/10* (2006.01)

(52) U.S. Cl. .................. 455/41.1; 455/41.2; 455/41.3; 455/66; 455/11.1; 455/101; 455/73; 455/82; 343/742; 343/862; 336/65

(58) Field of Classification Search .................. 455/41, 455/1–3, 66, 11.1, 101, 133, 274, 73, 82; 343/742, 862; 336/65
See application file for complete search history.

(56) References Cited

U.S. PATENT DOCUMENTS

| 5,128,972 | A | * | 7/1992 | Horinouchi et al. | ........ 375/377 |
| 5,771,438 | A | | 6/1998 | Palermo et al. | |
| 5,966,641 | A | | 10/1999 | Flowerdew | |
| 5,982,764 | A | | 11/1999 | Palermo et al. | |
| 6,292,081 | B1 | * | 9/2001 | Armfield et al. | ............... 336/65 |
| 6,424,820 | B1 | * | 7/2002 | Burdick et al. | ............ 455/41.1 |
| 6,459,882 | B1 | * | 10/2002 | Palermo et al. | ............ 455/41.1 |

* cited by examiner

*Primary Examiner*—Matthew D. Anderson
*Assistant Examiner*—Yuwen Pan
(74) *Attorney, Agent, or Firm*—Duane Morris LLP

(57) ABSTRACT

A system and method for implementing a wireless communications link between two equipment envelopes through inductive coupling include two "U" shaped inductors. Wireless communications is achieved via mutual inductance between the two inductors. Circuitry is provided, which enables the transmitter to determine if a receiver is within communications range. When the two envelopes are aligned, a dual-gap toroidal core is formed, in which the gaps have opposite polarity. The opposing polarity of the two gaps minimizes the far field signature of the transmitter/receiver pair, thus enhancing communication security.

5 Claims, 5 Drawing Sheets

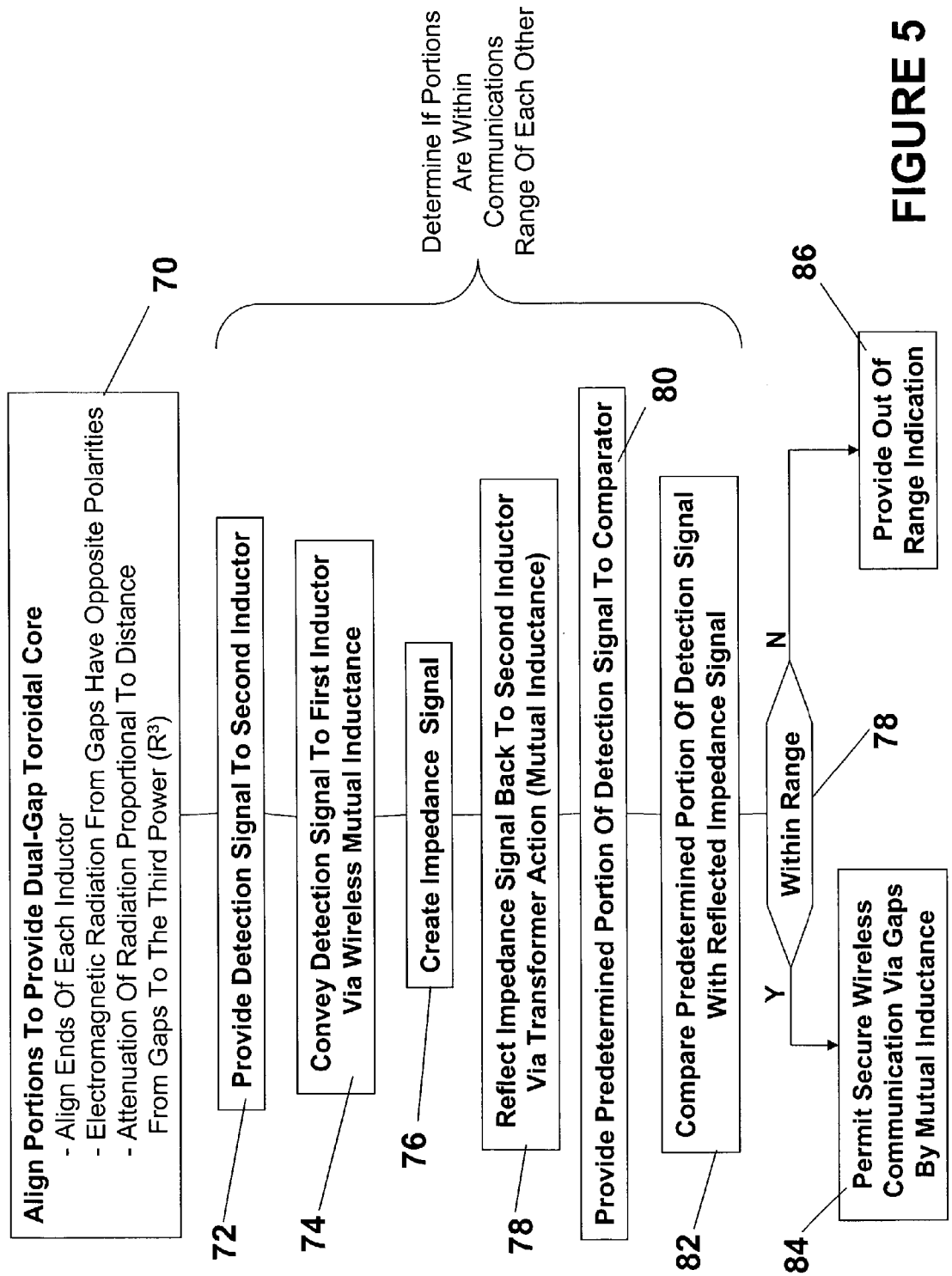

SYSTEM AND METHOD FOR SECURE WIRELESS CONNECTION

BACKGROUND

The present invention is generally related to short range wireless communication systems, and more specifically related to short range wireless communication systems utilizing inductive coupling.

It is often desirable to conduct communications between two self contained portions of a system, such as a military man portable radio and associated equipment used to load information (e.g., configuration parameters) into the radio. Typically, many types of military equipment (e.g., man portable radios) require military hardening (e.g., enhanced vibration, shock, environmental, electrical specifications) and watertight integrity (e.g., submersible equipment), thus warranting self contained portions.

Several disadvantages are associated with typical systems, which require that communications between the pieces of equipment be conducted via wired cables and electrical connectors, such as bayonet lock connectors and threaded connectors, for example. One disadvantage is that, in the field, carrying cables and/or connectors can place a burden on an operator. The cables/connectors are heavy and bulky, thus tiring the operator and slowing his reactions. Also, the size of the cables/connector can result in the operator becoming less covert.

Another disadvantage is that in the field, or during an operation in which little time is available, connecting and disconnecting the portions of the system can take too long, thus possibly jeopardizing the mission.

Another disadvantage is that these types of cables/connectors are subject to corrosion and interference with the operation of the connector (e.g., dirt in the threads) due to weather conditions and operational requirements, such as being submersed in water and/or mud, for example.

Many military situations require covert operations, including secure communications between portions of the system. Due to the covert nature of many military operations, the cables connecting the portions of the system must be shielded to prevent unauthorized disclosure of the information being transferred. An associated disadvantage is that shielded cables/connectors tend to be heavy, bulky, stiff, and difficult to quickly connect and disconnect.

Wireless systems have been explored. However, many wireless systems require that the structure (envelope) of the portions of the system be modified to facilitate communications. For example, a window may be put into a metallic envelope to support an infrared link. A associated disadvantage is that the envelope of the equipment is compromised.

Many wireless systems do not adequately address the requirement for secure communications. For example, optical wireless systems may be subject to unauthorized monitoring/access simply by being visually observed. Furthermore, typical wireless systems utilizing electromagnetic communications means transmit signals which are also easily subjected to unauthorized access.

An improved secure communications connection is desired.

In one embodiment, a secure wireless communication system comprises a first portion and a second portion. The first portion comprises a first inductor and the second portion comprises a second inductor. The first inductor comprises a first end and a second end. The second inductor comprises a third end and a fourth end. The first portion and the second portion define a gap therebetween. Wireless communication is achieved across the gap through mutual inductance between the first inductor and the second inductor by aligning the first end with the third end, and the second end the said fourth end.

In another embodiment, a method for providing secure wireless communications includes aligning the first portion of the communication system having the first inductor with the second portion of the communication system having the second inductor. When aligned, the first and second inductors form a dual-gap toroidal core. A wireless communication signal is conveyed across the gaps between the first and second portions via the first and second inductors.

BRIEF DESCRIPTION OF THE DRAWINGS

In the Figures:

FIG. 5 is a flow diagram of a process for providing wireless secure communication in accordance with an embodiment of the present invention.

DETAILED DESCRIPTION

An embodiment of a secure wireless communication system in accordance with the present invention comprises two separate portions, wherein each portion includes a "U" shaped inductor. When the two separate portions are aligned, the two inductors form a transformer having a dual-gap toroidal core. Wireless communication is conducted between the two portions via mutual inductance across the two gaps of the dual-gap toroidal core. This embodiment allows each portion to be self contained, which is particularly advantageous in military applications requiring military hardening and/or a watertight integrity. Secure communications are facilitated by the low power level of the signal conveyed via mutual inductance and by signal loss due to eddy currents formed in the walls of each portion. Secure communications are also facilitated because radiation of electromagnetic energy from each gap of the dual-gap toroidal core has an opposing polarity, thus essentially canceling radiating electromagnetic energy in the far field. As described in more detail below, attenuation of radiated electromagnetic energy from the two gaps is proportional to $1/r^3$, wherein r is the distance from the gaps, thus providing more secure communications than existing systems having attenuation proportional to $1/r^2$.

Figure 1:
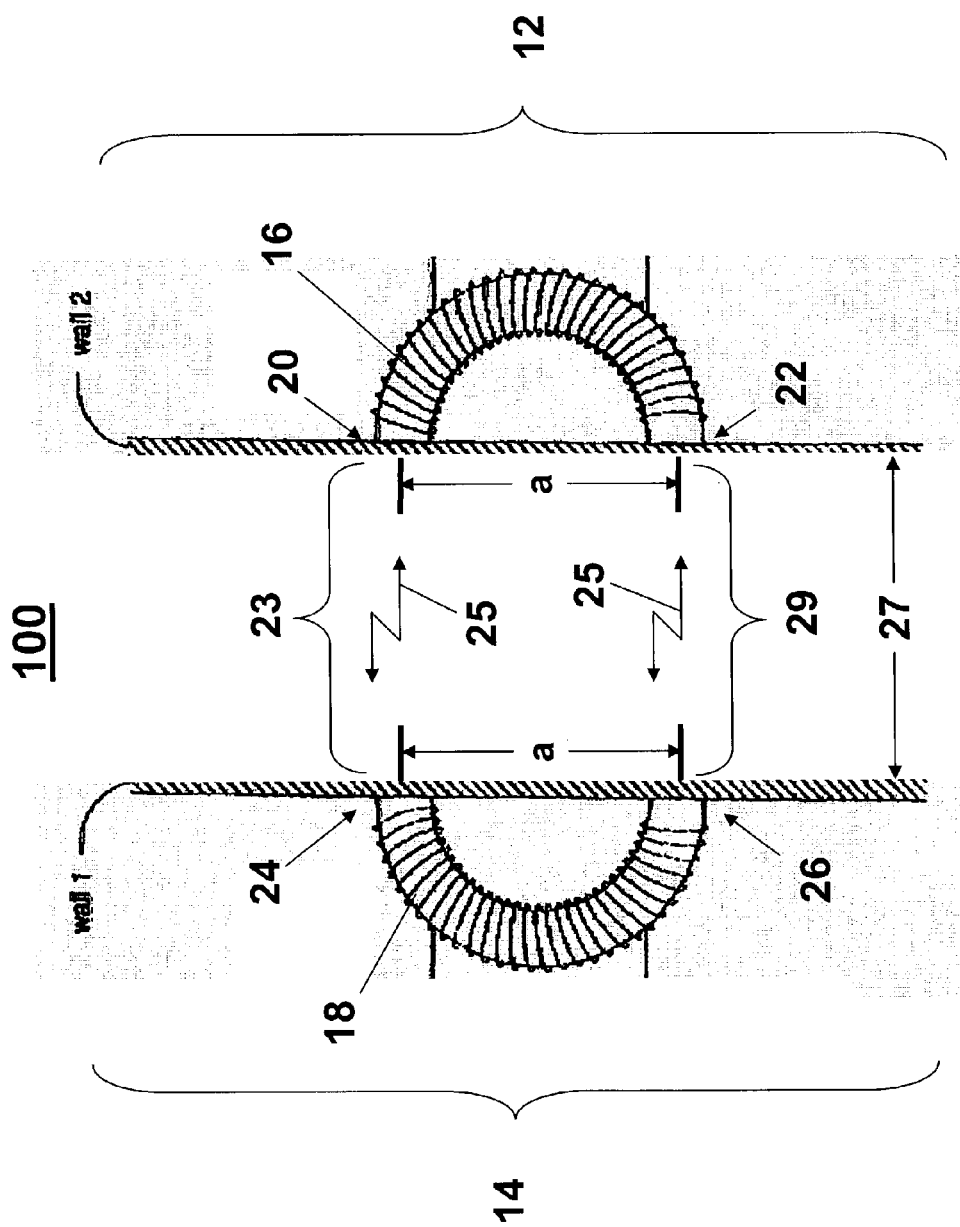
FIG. 1 is a cross sectional view of wireless secure connection illustrating a separation between the first and second inductors in accordance with an embodiment of the present invention.

Referring now to FIG. 1, there is shown a cross-sectional view of a wireless secure connection 100 comprising a first inductor 16 and second inductor 18 separated by a gap distance 27, illustrating wirelessly conveyed signal 25. The first inductor 16 comprises a first end 20 and a second end 22. The second inductor 18 comprises a third end 24 and a fourth end 26. Inductors 16, 18 are shown as "U" shaped.

The first end 20 and the third end 24 define a first gap 23 therebetween and the second end 22 and the fourth end 26 define a second gap 29 therebetween. However, each inductor 16, 18 may vary in shape and size, while maintaining a configuration having ends 20, 22, 24, and 26, respectively. For example, each inductor 16, 18 may be rectilinear, arcuate ("U" shaped being a subset of arcuate), or a combination thereof. The signal 25 is indicative of information communicated via mutual inductance between the inductors 16, 18.

Also shown in FIG. 1 is first portion 12 comprising the first inductor 16 and second portion 14 comprising the second inductor 18. Each portion, 12 and 14, is a separate self contained unit. Each portion, 12 and 14, may comprise, for example, a transmitter, a receiver, or a combination thereof. In one embodiment, the portion 12 is a military radio, such as a man portable military radio, for example, and the portion 14 is a faceplate and/or headset configured to provide information to the military radio 12 such as configuration/operational parameters (e.g., modulation type, transmit frequency, receive frequency), cryptographic keys, or a combination thereof. To aid in ensuring that the signal 25 is conveyed via mutual inductance between the first and second inductors 16, 18, the first and second portions 12, 14, are aligned.

Aligning the first portion 12 with the second portion 14 comprises aligning the first end 20 with the third end 24 and aligning the second end 22 with the fourth end 26. The first portion 12 and the second portion 14 are aligned to facilitate the conveyance of signal 25 between the respective ends, 20, 22, 24, 26, of inductors 16, 18. The first portion 12 and the second portion 14 may be aligned by any appropriate means. For example, one of the walls (wall 1 or wall 2) may comprise a protrusion, or a plurality of protrusions. The other wall may comprise a conformably shaped corresponding indentation, or plurality of indentations, (e.g., pimple and dimple) configured to receive each respective protrusion, such that when the protrusion(s) are inserted into the indentation(s), the first and second portions 12, 14, are aligned. Examples of other types of alignment means include slots, fasteners, visually aligning characteristics of the first and second portions 12, 14, (e.g., aligning edges of portions 12, 14, to be flush), or a combination thereof.

Wall 1 and wall 2 represent sides of portion 14 and portion 12, respectively. Each wall may comprise any appropriate material allowing electromagnetic energy to traverse therethrough. For example, each wall (1, 2) may comprise steel, iron, aluminum, plastic, ceramic, or combination thereof (including alloys). In situations where secure communications are desired, such as military scenarios wherein classified data is being communicated, it is advantageous for the signal 25 to be conveyed between the first portion 12 and the second portion 14 with as little error as practicable. However, it is also advantageous if the wireless signal 25 is attenuated as the distance from the source of the electromagnetic energy (e.g., the gaps 23, 29) increases. Thus, allowing the signal 25 to wirelessly convey information across the gaps 23, 29, but also preventing unauthorized access/monitoring of the signal 25 from a monitoring point a distance away from the gaps 23, 29.

For example, the first portion 12 may comprise a man portable military radio for communicating secure information with other radios. In the field, this radio may have to be reconfigured (e.g., change frequencies, provide cryptographic keys, change modulation type). Accordingly, the second portion 14 may be configured as a faceplate which fits on the front panel of the radio 12. When the faceplate 14 is aligned with the front panel of the radio 12, reconfiguration parameters may be wirelessly conveyed (e.g., via signal 25) to the radio 12 in a secure manner via mutual inductance. Furthermore, the configuration parameters may be predetermined, such that the radio operator need only activate a switch to select the set of configuration parameters to be conveyed to the radio 12 from the faceplate 14. This exemplary configuration of secure wireless connection 100 is particularly advantageous in situations where the radio operator is in a hostile environment and desires to keep his hands on his weapon.

Figure 2:
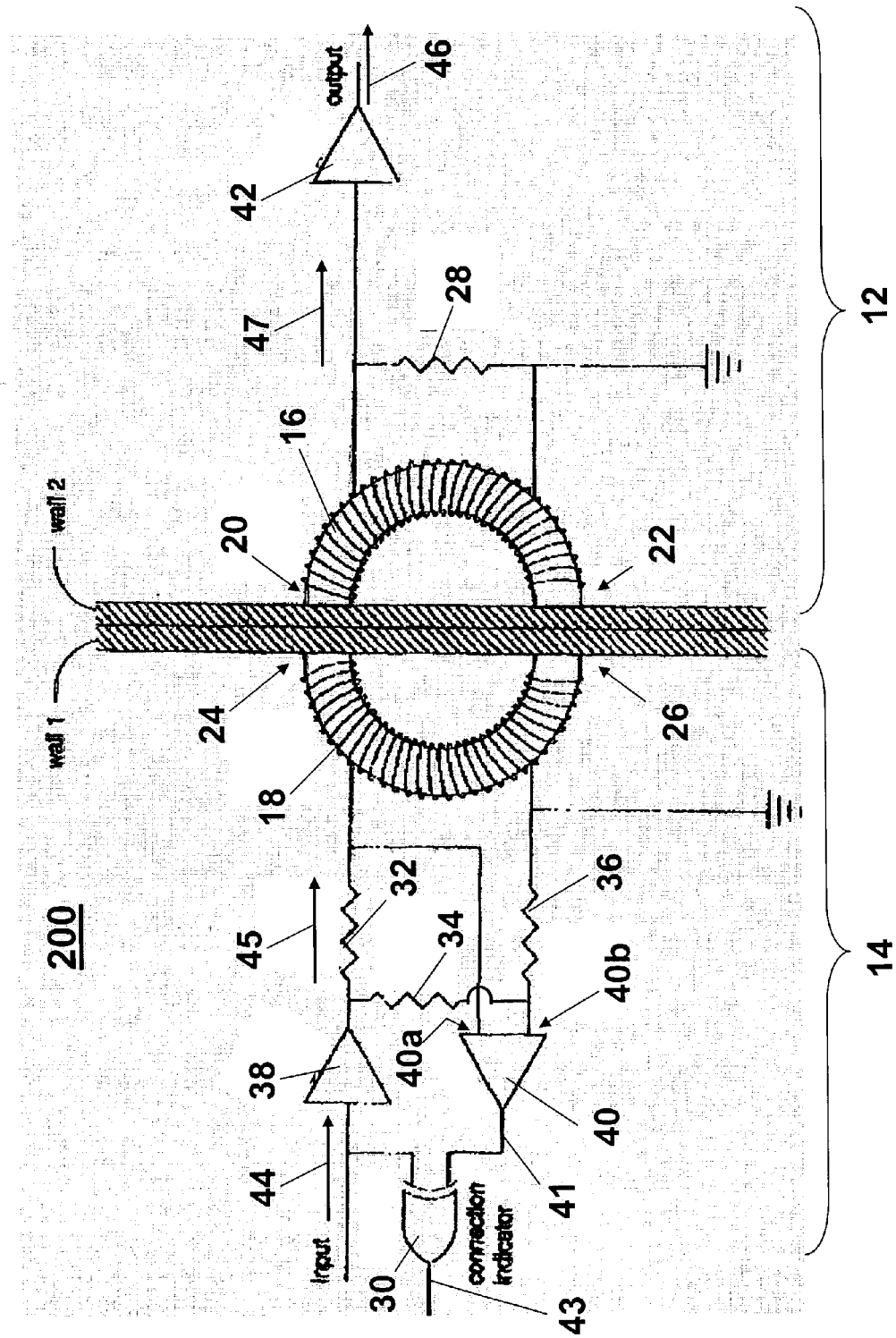
FIG. 2 is a combination schematic diagram and cross-sectional view of a system comprising a wireless secure connection in accordance with an embodiment of the present invention.

FIG. 2 is a diagram of a communication system 200 comprising the secure wireless connection 100 and amplification and detection circuitry, in accordance with an embodiment of the present invention. System 200 comprises input signal 44, input amplifier 38, exclusive or gate 30, comparator 40, sense resistance 32, a voltage divider circuit comprising resistance 34 and resistance 36, termination resistance 28, output amplifier 42, and output signal 46. The herein description of system 200 is in terms of the first portion 12 being a receiving portion and the second portion 14 being a transmitting portion, however, it is to be understood that the system 200 is not limited to this configuration. In one embodiment, the first portion 12 is a receiving portion (receiver) of the communication system 200 and the second portion 14 is a transmitting portion (transmitter) of the communication system 200. In this embodiment, input signal 44 is provided to the transmitting portion 14 and is conveyed, via wireless signal 25, to the receiving portion 12. The input signal 44 is indicative of information to be conveyed to the receiving portion 12, such as the configuration parameters described above, for example. The input amplifier 38 amplifies the input signal 44 and provides amplified signal 45 to the second inductor 18 via sense resistance 32. The input amplifier 38 may also filter the input signal 44. The amplified input signal 45 is provided to the second inductor 18 and transferred, via mutual inductance via the wireless signal 25 across the gaps 23, 29, to the first inductor 16. The conveyed signal 47 is provided to the output amplifier 42. The output amplifier 42 amplifies, and optionally filters, the conveyed signal 47 to provide output signal 46. It is envisioned that other embodiments of the system 200 may comprise various types of circuitry for performing signal processing, such as filtering, error detection, error correction, noise reduction, gain control, or a combination thereof, for example.

Another embodiment of the system 200 comprises detection circuitry for determining if the first portion 12 and the second portion 14 are within communication range of each other. Detection circuitry is advantageous in scenarios including secure communications. For example, if a radio operator wants to transmit configuration parameters to a radio via the wireless communication system 200, if the receiving portion 12 is not within communication range of the transmitting portion 12, secure information may be transmitted into the air, and possible intercepted by an unauthorized user. Detection circuitry, for determining if the first portion 12 and the second portion 14 are in communication range of each other, and for providing an indication of same, helps prevent this type of unauthorized access.

Detection circuitry, as depicted in FIG. 2, comprises the sense resistance 32, the voltage divider circuit comprising resistances 34 and 36, comparator 40, exclusive or gate 30, and termination resistance 28. It is to be understood that this configuration of detection circuitry is exemplary and that other configurations of detection circuitry are envisioned, such as via optical means, acoustic means, other electronic circuits, or a combination thereof, for example, wherein the goal is to determine if the first portion 12 and the second portion 14 are within communication range of each other. In operation, a detection signal is provided to the second inductor 18. This detection signal may be a signal specifically designated for determining if the first and second portions 12, 14, are within communication range of each other, may be a component of the information being conveyed from the first portion 14 to the second portion 12 (e.g., signals 44, 45), may be a specifically designed detection interspersed with the information, or a combination thereof. The detection signal is provided to the second inductor 18 via sense resistance 32. The voltage divider circuitry (resistances 34 and 36) provides a predetermined portion of the detection signal to input terminal 40b of the comparator 40. The detection signal is conveyed from the second inductor 24 to the first inductor 16 via mutual inductance across the gaps 23, 29 (e.g., signal 25). The termination resistance 28 provides termination impedance to the first inductor 16 which is reflected back to the second inductor 18 via transformer action. This reflected termination impedance develops a reflected signal, referred to as a reflected impedance signal. The reflected impedance signal is provided to the input terminal 40a. For example, if the first inductor 16 is not within communication range of the second inductor 18, no reflected impedance signal is generated, and the value of voltage provided to the input terminal 40a is indicative of this configuration. If the first inductor 16 is within communication range of the second inductor 18, a reflected impedance signal is created and the value of the voltage provided to input terminal 40a is indicative of this configuration and differs from the value of the voltage provided to the input terminal 40a when the inductors 16, 18, are within communication range of each other. The comparator 40 provides a comparison signal 41, which is indicative of the status of the determination if the first portion 12 is within communication range of the second portion 14. If the signal at terminal 40a is greater than the signal at terminal 40b, the comparison signal will provide one indication, and if the signal at terminal 40a is less than the signal at terminal 40b, than the comparison signal will provide another indication. Thus, the detection circuitry may be configured to indicate that the first and second portions 12, 14, are within communication range of each other by selecting specific (predetermined) values of resistance 34 and 36. Selecting predetermined values of resistances 34 and 36 provides a predetermined portion of the detection signal being provided to the input terminal 40b of the comparator 40. The values of the resistances 34 and 36 may be determined analytically, empirically, or a combination thereof. The comparison signal 41 is provided to the exclusive or gate 30, which also receives the detection signal. An indicator signal 43 is provided by the exclusive or gate 30. The indicator signal 43 is indicative of the determination if the first portion 12 and the second portion 14 are within communication range of each other. Response to the indicator signal 43 may be by the operator and/or may occur automatically. For example, upon receipt of the indicator signal 43, the radio operator (or the system) may choose to ignore the indicator signal 43, terminate transmission, not commence transmission, or a combination thereof.

As mentioned above, secure communications are facilitated if the attenuation of a wireless signal increases as the distance increases from the source of radiation of the wireless signal. Thus, the more rapidly the attenuation increases, as a function of distance, the more secure the system. Existing systems attenuate the radiated signal as a function of the distance from the source of radiation, r, raised to the second power ($1/r^2$). It has been shown, analytically, that a secure wireless connection in accordance with the present invention provides attenuation of the radiated wireless signal increases as a function of the distance from the source of radiation raised to the third power ($1/r^3$). A system providing attenuation as a function of $1/r^3$ is more secure than a system providing attenuation as a function of $1/r^2$.

Figure 3:
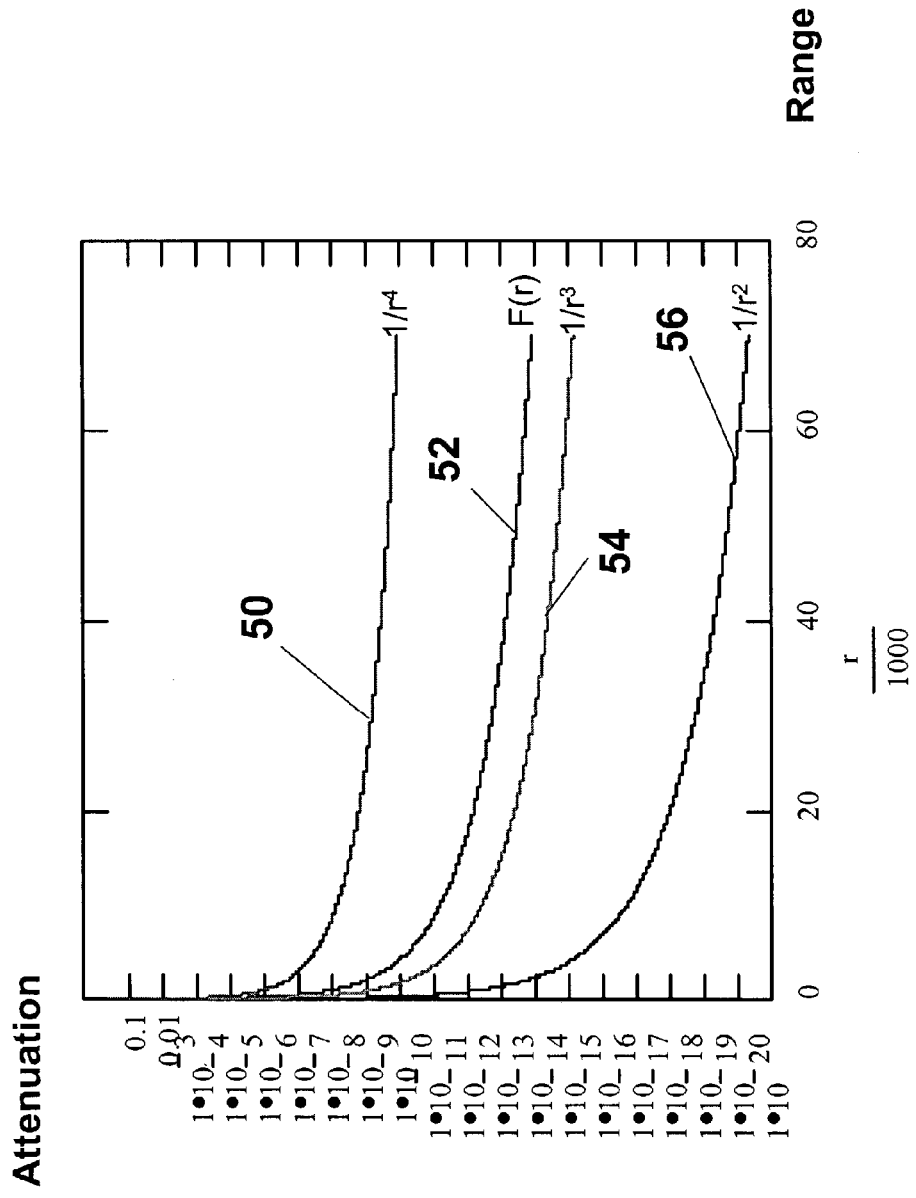
FIG. 3 is a plot comparing attenuation as a function of range for various range/attenuation relationships, in accordance with an embodiment of the present invention.

FIG. 3 is a graphical plot of attenuation versus range for attenuation in accordance with a secure wireless connection in accordance the present invention (curve 50), as a function of $r^4$ (curve 52), as a function of $r^3$ (curve 54), and as a function of $r^2$ (curve 56). It can be shown that the attenuation of a radiated electromagnetic signal (e.g., signal 25) is attenuated as a function of range, F(r), in accordance with the following equation.

$$F(r) = \frac{1}{r^2} - \frac{1}{(r+a)^2}, \qquad (1)$$

wherein:

F(r) is a function of r, r is the average distance from the two gaps (see FIG. 1), and "a" is a constant value equal to the distance between the two ends of an inductor (see FIG. 1).

Curve 50 is a plot of F(r), curve 52 is a plot of $1/r^4$, curve 54 is a plot of $1/r^3$, and curve 56 is a plot of $1/r^2$. As shown in FIG. 3, the curve 50 is closer to curve 54 than the other curves (50, 56). Thus the function F(r) is closest to attenuation as a function of $1/r^3$. Also, only curves 52 and 54 appear to have the same shape. If curves 52 and 54 have the same shape than the two curves are proportional.

Figure 4:
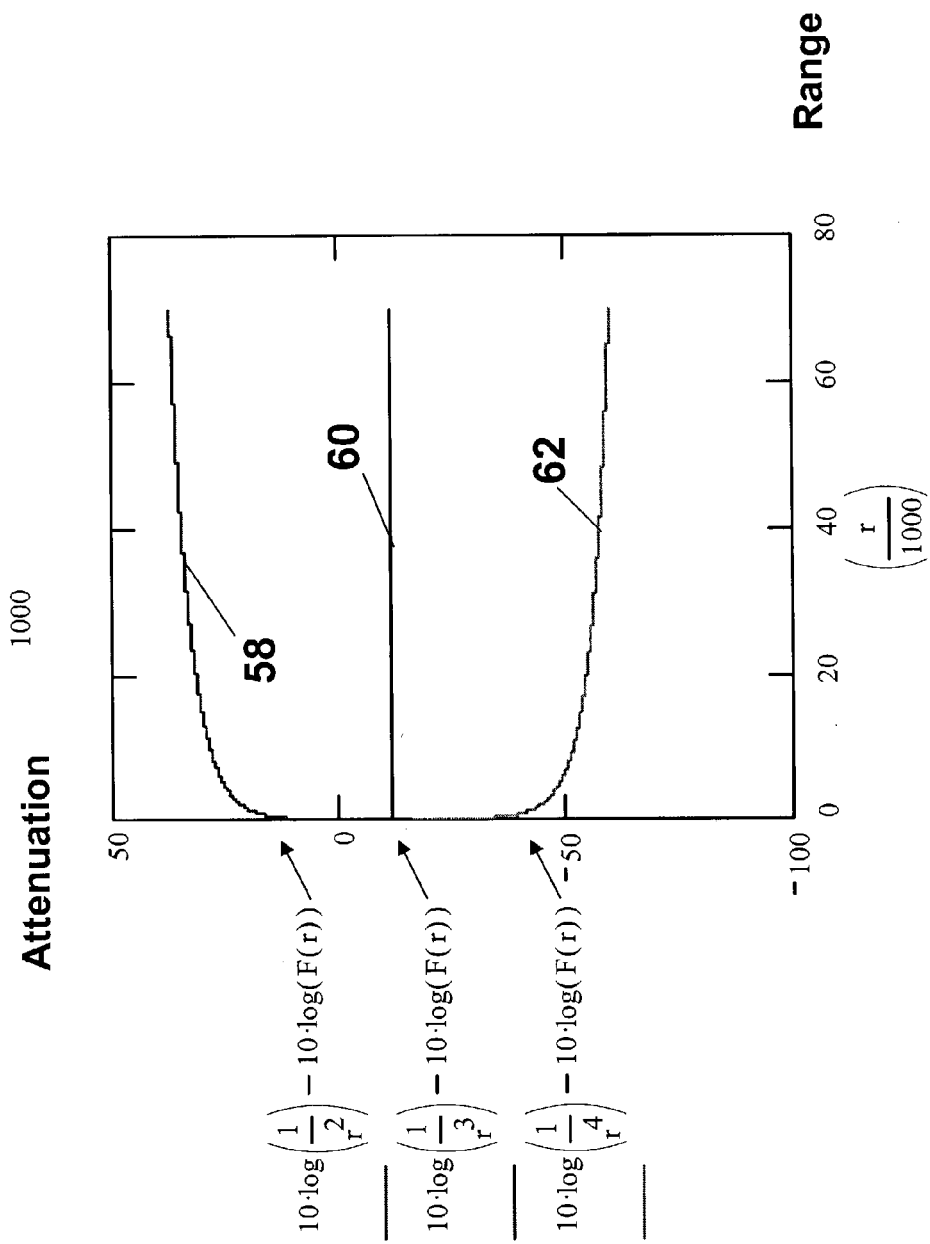
FIG. 4 is a plot comparing attenuation as a function of range for differences of various range/attenuation relationships, in accordance with an embodiment of the present invention.

FIG. 4 is a graph of the difference between curves 56 and 50 (curve 58), curves 54 and 50 (curve 60), and curves 52 and 50 (curve 62). Curve 58 is a plot of the difference between $10 \log 1/r^2$ (curve 56)–$10 \log F(r)$ (curve 50). As shown in FIG. 4, curve 58 is not a straight line, thus indicating that curves 50 and 56 are not the same shape. Curve 62 is a plot of the difference between $10 \log 1/r^4$ (curve 52)–$10 \log F(r)$ (curve 50). As shown in FIG. 4, curve 62 is not a straight line, thus indicating that curves 50 and 52 are not the same shape. Curve 60 is a plot of the difference between $10 \log 1/r^3$ (curve 54)–$10 \log F(r)$ (curve 50). As shown in FIG. 4, curve 60 is a straight line, thus indicating that curves 50 and 54 are the same shape, and thus proportional. Therefore, a secure wireless connection in accordance with the present invention provides attenuation of a radiated electromagnetic signal (e.g., signal 25) that is inversely proportional to the distance from the gaps raised to the third power (i.e., proportional to $1/r^3$).

FIG. 5 is a flow diagram of a process for providing wireless secure communication in accordance with an embodiment of the present invention. The first portion 12 and the second portion 14 are aligned at step 70. Aligning the first and second portion 12, 14, includes aligning the first end 20 of the first inductor 16 with the third end 24 of the second inductor 18, and aligning the second end 22 of the first inductor 16 with the fourth end 26 of the second inductor 18. When aligned, the inductors, 16, 18, are configured to form a dual-gap toroidal core. As described above, the polarities of the electromagnetic field created at each gap 23, 29, have opposite polarities. Thus, the opposite polarity fields cancel each other when combined (e.g., far field). Also, as described above, the attenuation of radiated electromagnetic energy from the gaps 23, 29, is attenuated in accordance with an equation proportional to $1/r^3$.

At steps 72 through 82, it is determined if the first portion 12 and the second portion 14 are within communications range of each other. At step 72, the detection signal (which may be amplifier and/or filtered) is provided to the second inductor 18. At step 74, the detection signal is conveyed from the second inductor 18 to the first inductor 16 via wireless mutual inductance. An impedance signal is created at step 76 (e.g., via termination resistance 28). The impedance signal is reflected back to the second inductor 18 via transformer action (mutual inductance) generating a reflected impedance signal at step 78. At step 80, a predetermined portion (e.g., via voltage divider circuitry) of the detection signal is provided to the comparator (e.g., comparator 40). The predetermined portion of the detection signal and the reflected impedance signal are compared with each other at step 82. If the first and second portions 12, 14, are within communication range, as determined at step 78, the secure wireless communications via mutual inductance via the gaps, 23, 29, of the dual-gap toroidal core may be conducted. If it is determined, at step 78, that the first and second portion 12, 14, are not within communication range of each other, an out of range indication is provided ate step 86. As described above, various courses of action may be pursued as a result of this out of range indication, such as manually and/or automatically ignoring the out of range indication, terminating communications, not initiating communications, or a combination thereof.

A secure wireless connection in accordance with the present invention facilitates secure communications by attenuating a radiated signal proportional to $1/r^3$, where r is the average distance from the two gaps of the dual-gap toroidal core. This secure wireless connection also provides a communications link between two self contained portions of a system through low frequency (e.g., voice or base band, low data rate signal) magnetic fields that can penetrate the envelope of the equipment when aligned with each other. Secure communications are also facilitated by the low power level of the transmitted signal, by eddy currents formed in the walls of the first and second portions 12, 14, and by aligning the first and second portions 12, 14. The secure wireless connection in accordance with the present invention does not require mechanical connectors, such as threaded connectors and/or bayonet connectors, thus reducing the weight and set up time. A system comprising the secure wireless connection in accordance with the present invention, such as a radio communication system, is capable of being configured to allow water tight integrity, military hardening, and does not require modification of the structure (envelope) of the first and second portions, 12, 14, to facilitate communications. Because no change in material is required, such as occurs when a window is put into a metallic envelope to support an infrared link, the envelope of the equipment is not compromised.

Although illustrated and described herein with reference to certain specific embodiments, the wireless secure connection as described herein is nevertheless not intended to be limited to the details shown. Rather, various modifications may be made in the details within the scope and range of equivalents of the claims and without departing from the spirit of the invention.

What is claimed is:

1. A secure wireless communication system comprising:
   a first portion comprising a first inductor having a first end and a second end;
   a second portion comprising a second inductor having a third end and a fourth end, wherein said first portion and said second portion define a gap therebetween, and wireless communication is achieved across said gap through mutual inductance between said first inductor and said second inductor by aligning said first end with said third end, and said second end with said fourth end; and
   detection circuitry for determining if said first portion and said second portion are within communication range of each other, said detection circuitry comprising:
   a termination resistance electrically coupled to said first inductor, said termination-resistance configured to provide a reflected impedance signal from said first inductor to said second inductor responsive to a detection signal; and
   a comparator electrically coupled to said second inductor and configured to receive said detection signal, wherein:
     said comparator compares said detection signal with said reflected impedance signal to determine if said first portion and said second portion are within communication range of each other.

2. A system in accordance with claim 1, further comprising a sense resistance electrically coupled to said second inductor for sensing said reflected impedance signal and providing indication of said reflected impedance signal to said comparator.

3. A system in accordance with claim 1, further comprising a voltage divider circuit for providing a predetermined portion of said detection signal to said comparator.

4. A method for providing secure wireless communications, said method comprising:
   aligning a first portion of a communication system having a first inductor with a second portion of a communication system having a second inductor, wherein when aligned said first and second inductors form a dual-gap toroidal core;
   conveying a wireless communication signal across said gaps between said first and second portions via said first and second inductors; and
   determining if said first portion is within communication range of said second portion by providing a detection signal to said first inductor, receiving a reflected impedance signal from said second inductor, and comparing said detection signal with said reflected impedance signal.

5. A method for providing secure wireless communications, said method comprising:
   aligning a first portion of a communication system having a first inductor with a second portion of a communication system having a second inductor, wherein when aligned said first and second inductors form a dual-gap toroidal core;
   conveying a wireless communication signal across said gaps between said first and second portions via said first and second inductors;
   determining if said first portion is within communication range of said second portion; and
   providing an out of range indication signal if said first portion is determined not to be within communication range of said second portion.

* * * * *